United States Patent
Parigian (10) Patent No.: US 6,871,867 B2
(45) Date of Patent: *Mar. 29, 2005

(54) MULTI-LINKING, REAR SUSPENSION SYSTEM FOR TWO-WHEELED MOTOR VEHICLES

(76) Inventor: Greg M. Parigian, 10446 Variel Ave., Chatsworth, CA (US) 91311

( * ) Notice: Subject to any disclaimer, the term of this patent is extended or adjusted under 35 U.S.C. 154(b) by 0 days.

This patent is subject to a terminal disclaimer.

(21) Appl. No.: 10/414,631

(22) Filed: Apr. 15, 2003

(65) Prior Publication Data

US 2003/0193164 A1 Oct. 16, 2003

Related U.S. Application Data

(63) Continuation-in-part of application No. 10/050,315, filed on Jan. 15, 2002, now abandoned, which is a continuation-in-part of application No. 09/740,517, filed on Dec. 19, 2000, now abandoned.

(51) Int. Cl.$^7$ ................................................ B62K 1/00
(52) U.S. Cl. ...................................... 280/284; 180/227
(58) Field of Search ................................ 180/219, 227; 280/284, 285, 275

(56) References Cited

U.S. PATENT DOCUMENTS

| 4,322,088 | A | * | 3/1982 | Miyakoshi et al. | ......... 280/284 |
|---|---|---|---|---|---|
| 4,529,056 | A | * | 7/1985 | Kreuz | .......... 180/227 |
| 4,574,909 | A | * | 3/1986 | Ribi | ............ 180/227 |
| 5,259,637 | A | * | 11/1993 | Busby | .......... 280/284 |
| 5,435,584 | A | * | 7/1995 | Buell | ........... 280/284 |
| 5,452,910 | A | * | 9/1995 | Harris | ......... 280/284 |
| 6,056,307 | A | * | 5/2000 | Busby et al. | ............. 280/284 |
| 6,161,858 | A | * | 12/2000 | Tseng | ...... 280/281.1 |
| 6,386,568 | B1 | * | 5/2002 | Tribotte | ........ 280/284 |
| 6,598,893 | B2 | * | 7/2003 | Parigian | ....... 280/284 |
| 2003/0038450 | A1 | * | 2/2003 | Lam | ............ 280/284 |

\* cited by examiner

Primary Examiner—Daniel G. DePumpo
(74) Attorney, Agent, or Firm—Kelly Lowry & Kelly, LLP; Aaron T. Borrowman (57) ABSTRACT

A rear suspension system for two-wheeled motor vehicles having a generally triangular configuration includes upper and lower pivot arm assemblies pivotally connected to a frame of the vehicle. A control arm is interconnected between the pivot arm assemblies. A rear wheel supporting unit, including upper and lower arm assemblies, is connectable to an axle of a rear wheel of the vehicle at a first end thereof. The upper arm assembly of the supporting unit is connected to the upper pivot arm assembly. The lower arm assembly of the supporting unit is connected to the lower pivot arm assembly. A compressible shock unit is provided to dampen movement of the system.

15 Claims, 7 Drawing Sheets

MULTI-LINKING, REAR SUSPENSION SYSTEM FOR TWO-WHEELED MOTOR VEHICLES

RELATED APPLICATION

This application is a continuation-in-part of U.S. application Ser. No. 10/050,315, filed Jan. 15, 2002 now abandoned, which is a continuation-in-part of U.S. application Ser. No. 09/740,517, filed Dec. 19, 2000 now abandoned.

BACKGROUND OF THE INVENTION

The present invention relates generally to two-wheeled vehicles. More particularly, the present invention relates to a rear suspension system for two-wheeled motor vehicles, such as motorcycles, employing pivoting arm assemblies and control arms possessing shock absorption characteristics and providing lateral stability.

The existing designs of most prior art rear suspension assemblies for two-wheeled motor vehicles include a rear pivot from a single point either from a dual or mono shock system that either extends or comprises the shock unit. In this respect, when the shock system is affected by power or braking to the rear wheel, system efficiency and stability are compromised. Other systems use a quad-type configuration that only connects to a small section of the frame, providing less structural integrity.

Although recent motorcycle frames include a swing arm configuration, these configurations posses certain deficiencies that detract from their overall utility. The swing arm movement is typically in a single pivoting motion with no lateral stability. This causes lateral instability for the rear wheel of the motorcycle. Many existing suspension systems provide inadequate control of the wheel to pavement contact. This can create safety concerns regarding the control of the increased stopping during braking. Aside from the rear wheel wobbling, as described above, many current designs transfer force back to the front of the vehicle under acceleration.

Accordingly, there is a need for a rear suspension system for a two-wheeled motor vehicle, which improves rear wheel geometry. Such a system should also increase lateral stability of the rear wheel of the vehicle and improve wheel contact with the pavement. Such a system should further contain the power under acceleration and not transfer force back to the front of the vehicle. The present invention fulfills these needs and provides other related advantages.

SUMMARY OF THE INVENTION

The present invention resides in a rear suspension system for two-wheeled motor vehicles. The system of the present invention has the ability to keep the same arc from the wheel axle point and the transmission drive sprocket positions as the suspension moves upwardly and downwardly, thus plotting a constant path in relation between axes points. The system can be adjustable for any desired arc pattern.

The system of the present invention generally comprises upper and lower pivot arm assemblies pivotally connected to the frame of the vehicle. A control arm is interconnected between the pivot arm assemblies. A rear wheel supporting unit, comprised of upper and lower arm assemblies, is connectable to an axle of a rear wheel of the vehicle at a first end thereof. An upper second end of the supporting unit is connected to the upper pivot arm assembly. A lower end of the rear wheel supporting unit is connected to the lower pivot arm assembly. A compressible shock unit is connected between the rear wheel supporting unit and the vehicle frame. Typically, the compressible shock is connected to either the lower pivot arm assembly, or the rear wheel supporting unit at one end thereof, and the vehicle frame at the opposite end thereof. Alternatively, the shock may be connected to either the upper pivot arm assembly and frame, or upper arm assembly and frame.

In a first embodiment, the rear suspension system includes generally parallel and spaced apart first and second axle plates having aligned apertures for accepting an axle of the rear wheel. The first and second axle plates are connected to the first ends of the upper and lower arm assemblies.

The upper arm assembly is comprised of a base pivotally connected to the upper pivot arm assembly, and having a first elongated arm extending from the base to the connection point at the first axle plate, and a second elongated arm extending from the base generally parallel to the first arm to a connection point at the second support axle plate. The lower arm assembly comprises a base connected to the lower pivot arm assembly. A first elongated arm extends from the base to a connection point at the first support axle plate. A second elongated arm extends from the base generally parallel to the first arm to a connection point at the second support axle plate. It will be understood by those skilled in the art that the various connection points may be pivotal, depending upon the intended characteristics of the system.

In a second embodiment, the lower arm assembly comprises a base connected to the lower pivot arm assembly, and has a first elongated arm extending from the base and including a connection point for the rear wheel, such as an aperture formed therein. A second elongated arm extends from the base generally parallel to the first arm and includes a connection point, typically an aligned aperture, for the rear wheel. The upper arm assembly is comprised of a base pivotally connected to the upper pivot arm assembly, and first and second elongated arms which extend from the base to connection points at the lower arm assembly. Such connection points may be pivotal.

The lower pivot arm assembly comprises a pair of angular brackets which are spaced apart from one another so as to be generally parallel, and having a shaft extending between ends thereof for pivotal connection to the vehicle frame. A shaft extends through second ends thereof for pivotal connection to the rear wheel support unit, the base or lower arms of the lower arm assembly.

The control arm and elongated arms of the upper and lower assemblies may be adjustable in length.

The above-described system has a generally triangular configuration. With the system of the present invention, lateral stability is created for the rear wheel of the two-wheeled vehicle. In addition the axle location for the wheel is controlled in a structured motion in relation to the drive system, sprocket or shaft. The length of the arm assemblies and the length of the pivot arm assemblies interconnected with the control arms achieve the ability to position the rear axle in a unlimited number of positions in relation to the frame. This also means that it has the ability for a maintained equal distance from the drive system, sprocket or shaft in relation to the rear axle location in motion thus allowing no slack to be created in the drive system.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the drawings for purposes of illustration, the present invention is concerned with a rear suspension system for two-wheeled vehicles, generally referred to by the reference number 10 in FIGS. 1–6. The rear suspension system 10 is particularly designed and adapted for use in a motorcycle 16, although it could conceivably be incorporated into any two-wheeled vehicle.

Figure 1:
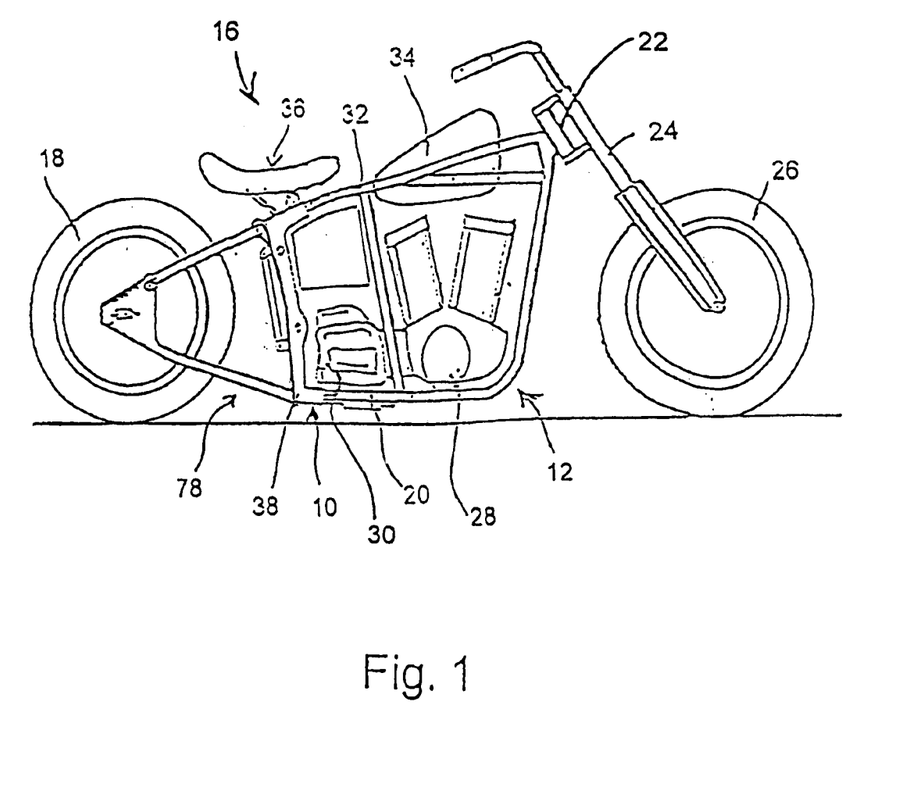
FIG. 1 is a side elevational view of a motorcycle incorporating a rear suspension system embodying the present invention.

With reference to FIG. 1, a motorcycle 16 is illustrated incorporating the rear suspension system 10 of the present invention. The primary structural component of the motorcycle is the frame 12. The frame 12 is typically comprised of two bottom support tubes 20 which are bent at an upwardly directed angle at a front end thereof to a head tube 22. The head tube 22 is connected to a front wheel torque assembly 24 upon which the front wheel 26 is rotatably mounted. The bottom support tubes 20 also provide an anchor and base for the motor 28, transmission 30, etc. A top support tube 32 extends from the head tube 22 towards the rear of the motorcycle 16, and supports the gas tank 34, seat 36, etc. A rear pair of tube 38 interconnects the top and bottom support tubes 32 and 20, and serve as a rear end of the overall frame 12. Conventionally, the rear suspension is connected to the rear pair of tubes 38 with cross bars or the like. In the present invention, a generally triangular triaxial suspension system 10 extends between the rear tubes 38 and the rear wheel 18 of the motorcycle 16.

Figure 2:
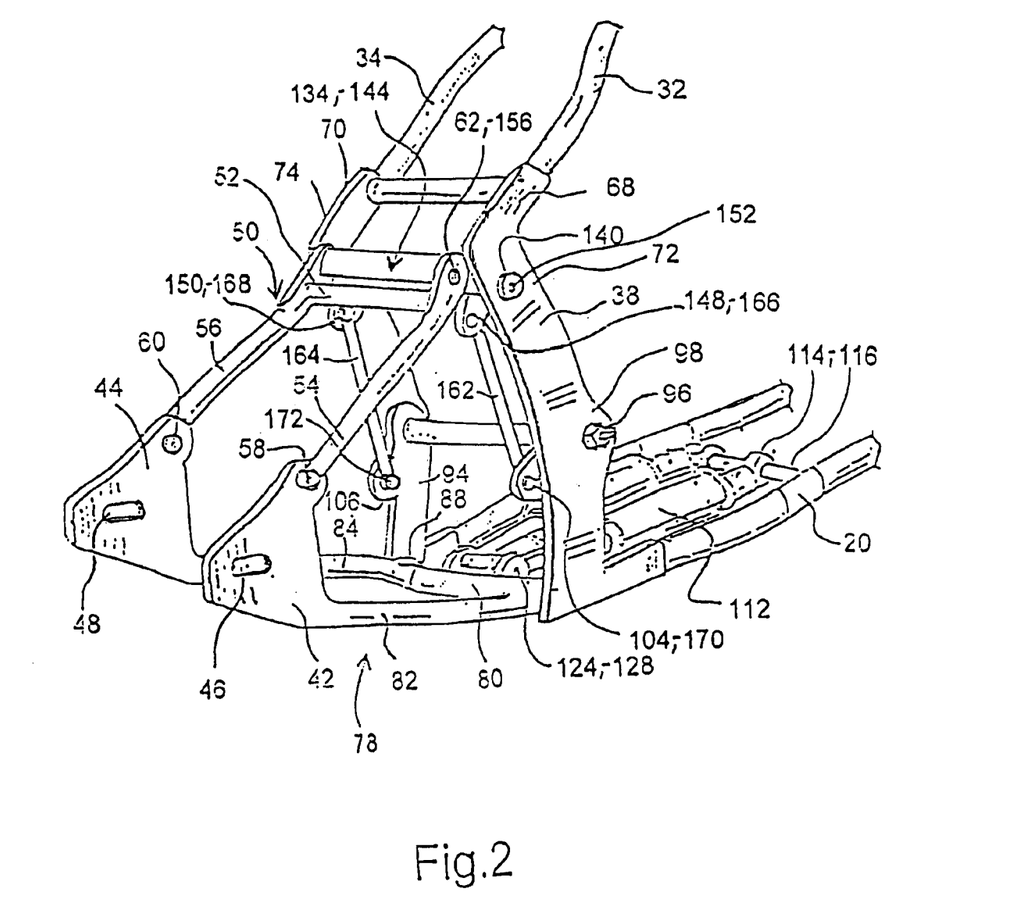
FIG. 2 is a perspective view of the rear suspension system similar to that illustrated in FIG. 1.

With reference to FIG. 2, the rear suspension system 10 of the present invention includes an upper pivot arm assembly 134 comprising a pair of angular brackets 136 and 138 spaced apart and generally parallel to one another. A first base 140 extends between the first ends thereof for the pivotal connection between the rear tubes 38 of the frame 12, typically by pins 152 and 154 extending between the mounting ears 72 and 74 extending from the upper frame unit 68 and 70 extending from the rear tubes 38 of the frame 12. Of course, other appropriate means of pivotally connecting the upper pivot arm assembly 134 to the rear portion of the frame 38 can also be used. A second base 144 extends between the second ends thereof for the pivotal connection between the upper arm assembly arms 62 and 64, typically by pins 156 and 158 extending between the upper pivot arm brackets 136 and 138 extending to the upper arms assembly 54 and 56. Of course, other appropriate means of pivotally connecting the upper pivot arm assembly 134 to the upper arm assembly 50 can also be used. The upper arm assembly 50 is generally U-shaped, and includes a base 52 having first and second elongated arms 54 and 56 extending thereof to connection points 58 and 60 of the axle plates 42 and 44, respectively, which may be pivotal. Typically, the arms 54 and 56 are rigidly connected to an upper portion of the upper arm assembly 52 which allows the arms 54 and 56 to pivot and rotate, such as rocker arm fasteners, pins, bushings, etc. The upper arm assembly 50 is pivotally connected to the upper pivot arm assembly 134 typically by pins 156 and 158 extending between upper pivot arm brackets 136 and 138 extending between the first and second elongated arms 54 and 56 from the base shaft 52. Of course, other appropriate means of pivotally connecting the upper arm assembly 50 to the upper pivot arm assembly can also be used.

A lower arm assembly 78 extends adjacent to a lower portion of the rear end 38 of frame 12, and a lower end of each axle plate 42 and 44. The lower arm assembly 78 includes a general U-shaped member having a base 80 and elongated arms 82 and 84 extending from the base 80 to a connection point on each respective axle plate 42 and 44.

The lower arm assembly 78 is pivotally connected to the frame 12 via a lower pivot arm assembly 90. This assembly 90 is generally H-shaped and includes two brackets, 92 and 94 which are angled and spaced apart from one another so as to be generally parallel to one another. A shaft or pin 96 extends between a first end of the brackets 92 and 94 for pivotal connection to mounting ears 98 and 100 extending from the rear frame tubes 38. Similarly, a shaft or pin 102 extends through the opposite ends of the brackets 92 and 94 for pivotal connection to lower arm assembly 82 and 84, usually intermediate ends thereof. Although the pivot arms 90 and 134 are illustrated as having an angled configuration, it should be understood by the reader that the invention is not limited to such, the pivot arms also being capable of being designed to be straight and without angle.

Figure 7:
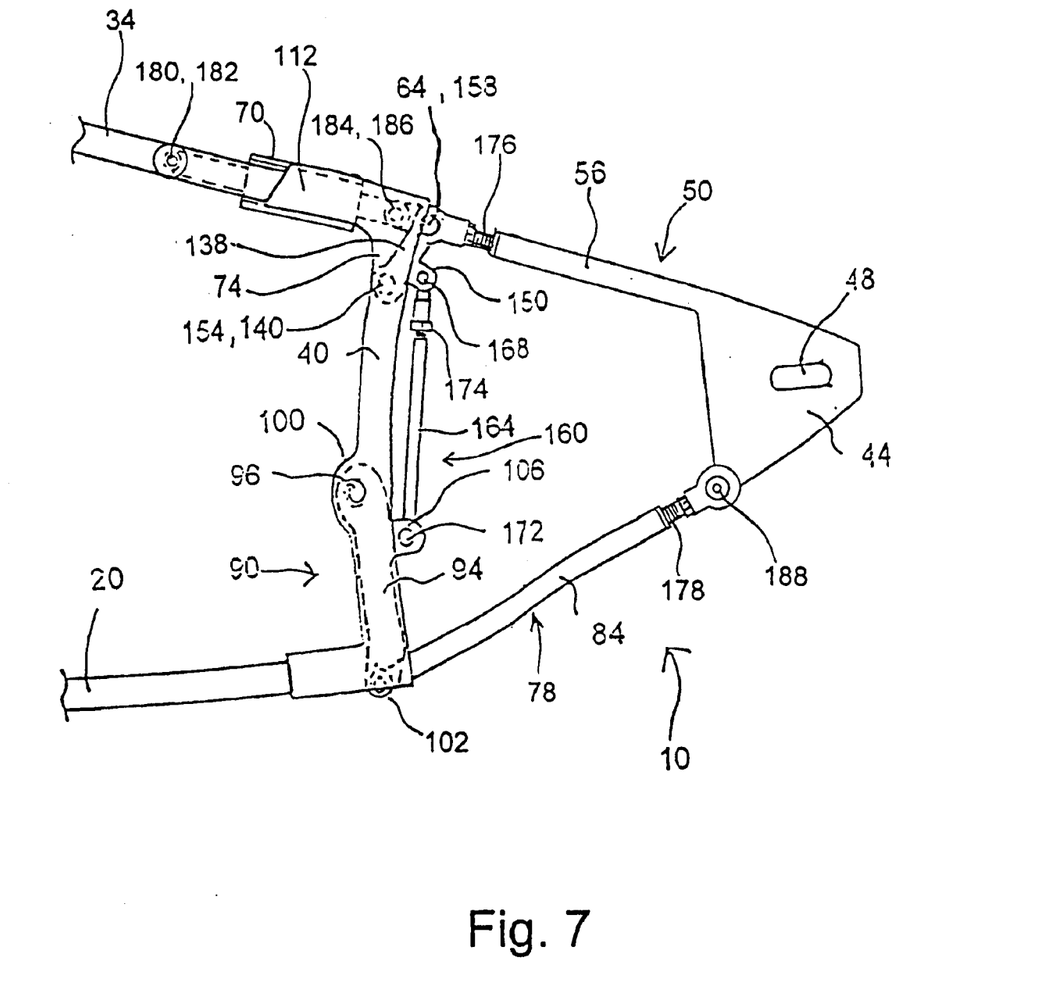
FIG. 7 is a side elevational view of the rear suspension system, illustrating a shock absorber interconnected between the frame and upper portion of the rear suspension system.

The lower arm assembly 78 may include pivotal connections 188 to axle plates 42 and 44, as shown in FIG. 7, thus allowing the upper arm assembly 50 to be solidly connected to the axle plates 42 and 44.

The upper and lower arm assemblies are collectively referred to herein as a rear wheel supporting unit, which serves to connect to an axle of the rear wheel of the vehicle.

The control arm assembly 160 is pivotally interconnected to the upper pivot arm assembly 134 and the lower pivot arm assembly 90. The first ends of control arms 162 and 164 are pivotally connected to the upper pivot arm assembly 134 typically by pins 166 and 168 extending between mounting ears 148 and 150 extending from the upper pivot arm plates 136 and 138. The second ends of the control arms 162 and 164 are pivotally connected to the lower pivot arm assembly 90 between the mounting ears 104 and 106, typically by pins 170 and 172, extending from the lower brackets 92 and 94. Although two control arms 162 and 164 are shown, only one control arm may be used.

Figure 3:
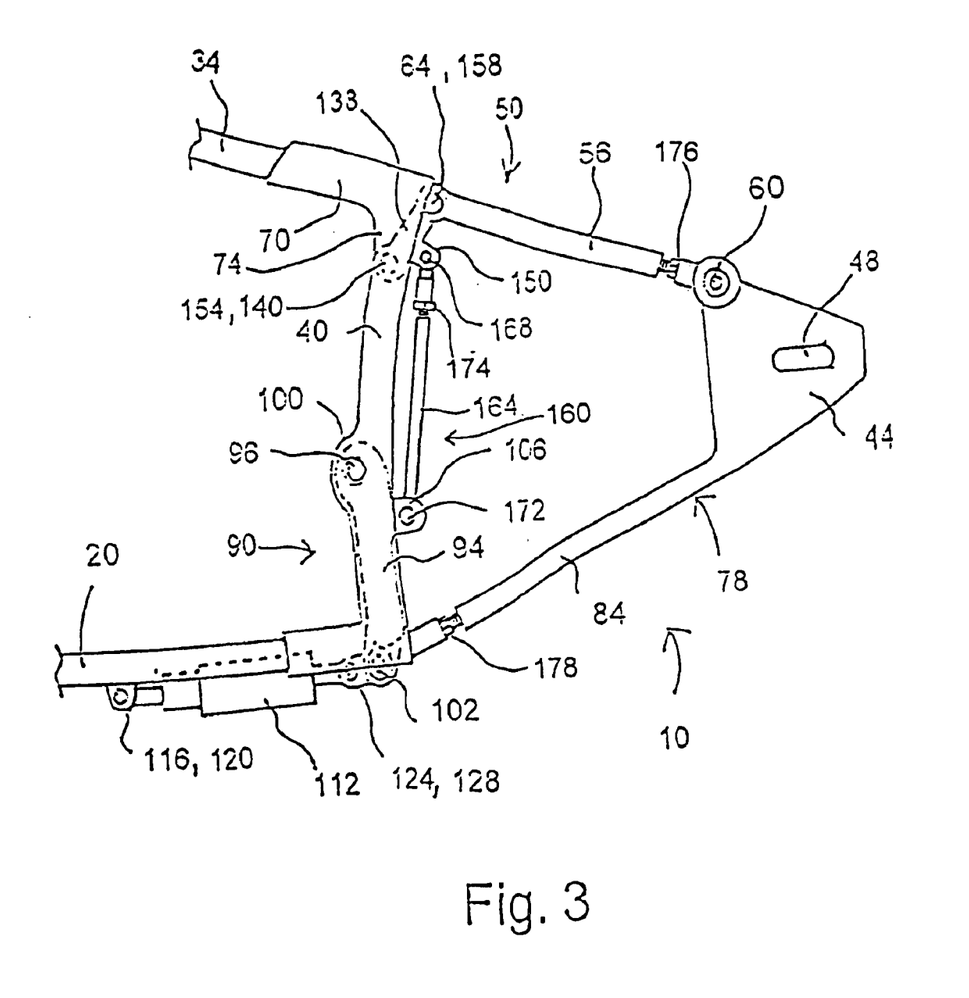
FIG. 3 is a side elevational view of the rear suspension system of FIG. 2 in a relaxed state.
Figure 4:
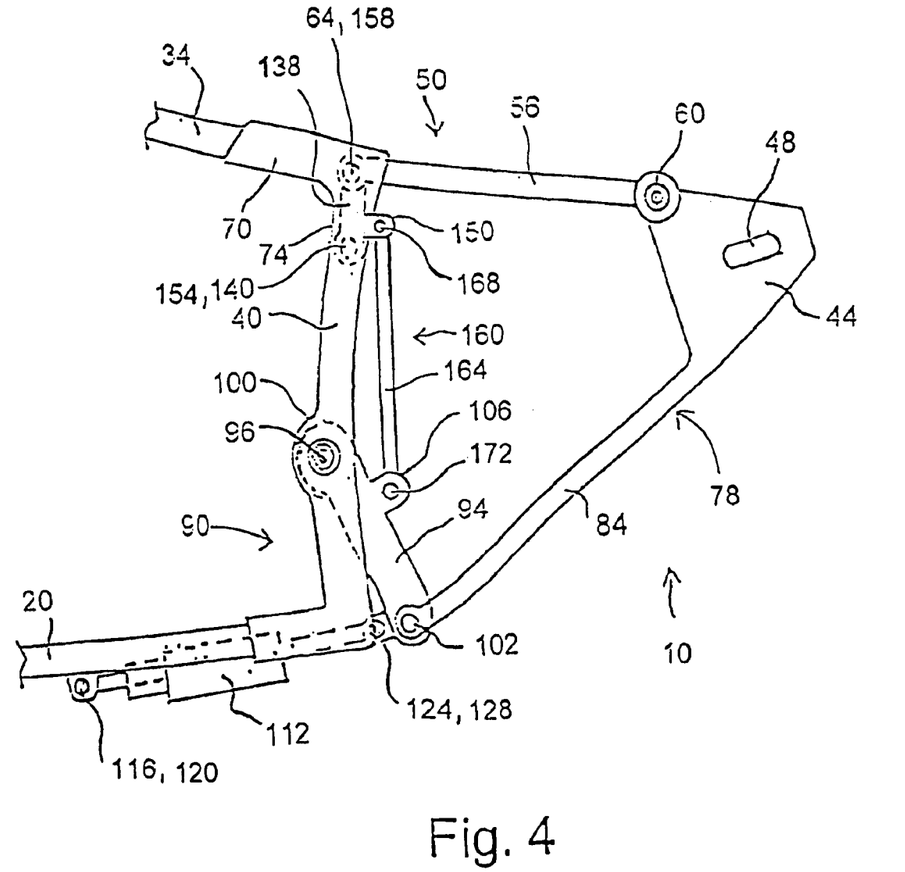
FIG. 4 is a side elevational view of the rear suspension system of FIG. 2 in a compressed state.
Figure 5:
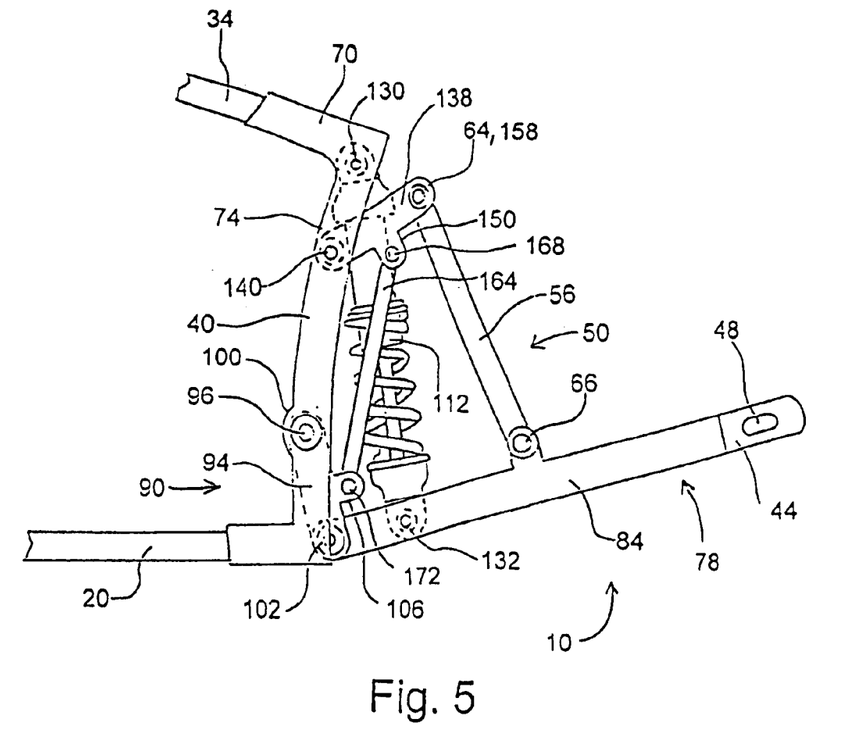
FIG. 5 is a side elevational view of the rear suspension system showing altered pivot point and shock locations.

A shock unit 112, such as a shock absorber typically having a compressible spring, is pivotally interconnected between the rear wheel supporting unit and the frame 12 of the motorcycle 16. As shown in FIGS. 2–4, the shock unit 12 is interconnected between the lower tubes 20 of the frame 12 and the lower arm assembly 78 or pivot arm assembly 90. Typically, this is done by connecting an upper end of the shock unit 112 with an appropriate fastener 118 and 120, such as a rotatable pin or the like, to mounting ears 114 and 116 extending from the lower tubes 20 of the frame 12, or any other rear end portion of the frame 12. The opposite end of the shock unit 112 is pivotally attached intermediate ends of the lower arm assembly brackets 122 and 124. This is done by attaching the appropriate fastener, such as pins 126 and 128 or the like. The shock, or shock units unit shown in the horizontal position may be also placed in the vertically position upwardly within the vertical frame rails 38 and 40 as shown in FIG. 5.

FIG. 3 illustrates the suspension system 10 in a relaxed state. FIG. 4 illustrates the suspension system 10 in a compressed state, such as when the rear wheel 18 encounters a bump. As the motorcycle 16 moves and is subjected to uneven surface bumps or ruts, the system 10 acts in the following manner. The overall movement can best be described as a knee-action movement. As the shock unit 112 is compressed from upper pressure of the wheel 18, the pivot arm assemblies 94 and 138 are pivoted upwardly about the axis of fasteners. This results in the lower arm assembly 90 pivoting in an upward planar motion causing the control arm 164 to release the upper pivot arm assembly 138 to pivot in a relative motion thus controlling the motion of the axle plates 42 and 44 to move upwardly in a planar motion as well. The upper arm assembly 50 also articulates and pivots upwardly in response. The upwardly directed planar motion results in controlled directional movement. The amount of travel of motion of the upward arm is controlled by the shock unit 112. As this pressure is reduced, the system 10 reverses this action and conforms to its balanced pre-shock tension position, as illustrated in FIG. 3. The system 10 maintains tension through the weight of the motorcycle 16 pressing down on the shock unit 112.

The downward rebound pivotal motion of the rear suspension system 10 is essentially the reverse of that described above. As the compressible shock unit 112 decompresses after rebound, the lower pivot arm assembly 94 pivots in a downward motion causing the control arms 164 to pull on the upper pivot arm assembly 138 to pivot in a relative motion thus the lower arm assembly 84 to move in a downward motion. This in turn causes the axle support plate 44 to move downward, resulting in the upper arm assembly 56 being pulled downward also. The upwardly and downwardly directed motions are eventually ceased by virtue of the shock-absorbing unit 112.

With reference to FIG. 3 adjustable screw assemblies 174, 176,178 are shown that may be placed on the arm assemblies 164, 56, 84 and on the opposite ends of the arm assemblies for use of tuning the suspension. These adjustable screw assemblies 174, 176, 178 may motion the arm assemblies to a location that may help alignment and control travel that will benefit the suspension system stability. The control arm assembly 164 displays the adjustable screw assembly 174 which consist of a male screw unit attached to the control arm assembly 164 and a counter part female screw receiver attached to the other end with a locking device such as a jam nut or the like. Additionally the upper arm assembly 56 displays a adjustable screw assembly 176 and the lower arm assembly 84 displays a adjustable screw assembly 178 which consist of the same description as the adjustable screw assembly 174. These adjustable screw assemblies 174, 176, 178 as described may be placed on opposite ends of the arm assemblies. Of course, other means of making the control arms and assemblies adjustable which are known in the art are contemplated by the invention as well.

With reference to FIG. 5, the rear suspension system 10 of the present invention is shown with the upper arm assembly 56 pivotally connected 66 to the lower arm assembly 84 at a mid-location on the lower arm assembly 84. This pivotal connection point 66 may be connected anywhere along the lower arm assembly 84. The shock unit 112 may be located in a upward connection to the upper frame area 70 with a pivotal connection point 130. Alternatively, the lower part of the shock 112 with a pivotal connection point 132 to the lower arm assembly 84 or in conjunction or a part of the lower pivot arm assembly 94. The shock unit 112 may also be directly pivotally connected to the lower pivot arm assembly 94 in the same manner. This described embodiment functions in the same manner as described in the reference to FIG. 3 and FIG. 4. The shock 112 is located in a upwardly location and compresses upwardly and downwardly.

Figure 6:
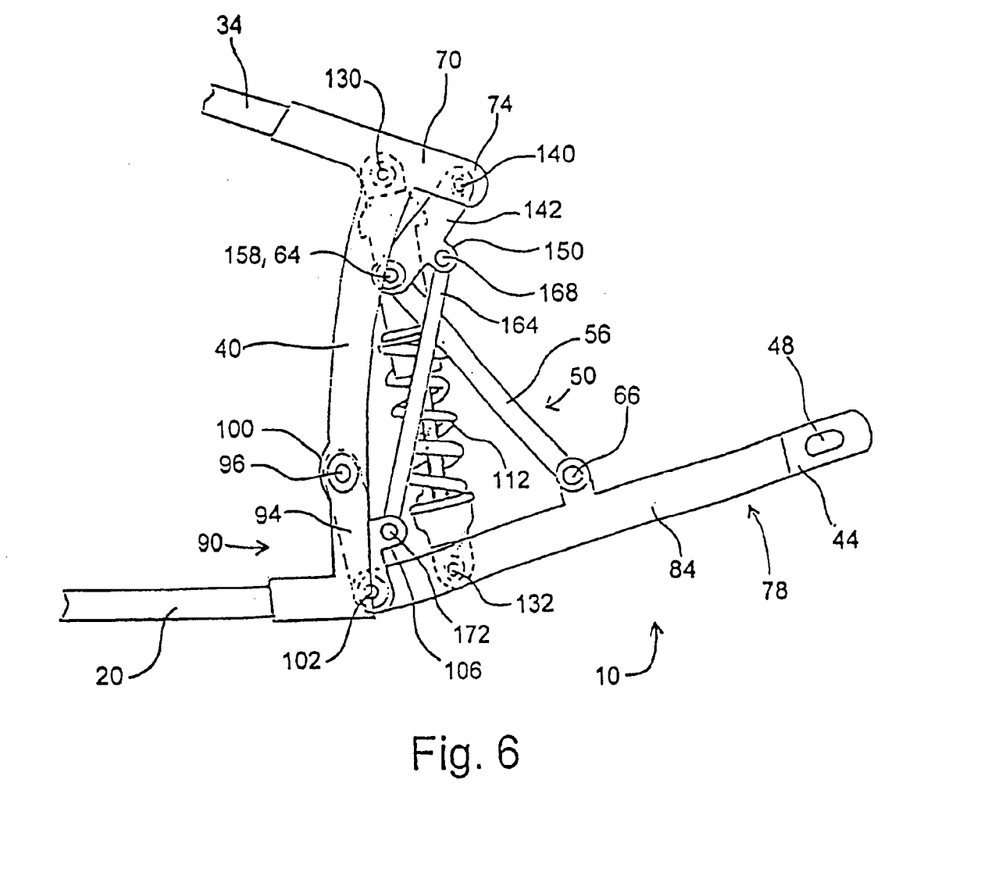
FIG. 6 is a side elevational view of the rear suspension system similar to that illustrated in FIG. 5 displaying an inverted upper pivot arm assembly.

With reference to FIG.6, the rear suspension system 10 of the present invention is shown with the upper pivot arm assembly 142 inverted with a pivotal connection 140 to the upper frame ear 74. The opposite end is pivotally connected 64 with pins and fasteners 158 to the upper arm assembly 50. Shown also is the same shock 112 mounted configuration as in FIG. 5. The shock unit 112 may be connected to the lower pivot arm 94 as in the same manner as described in FIG. 5.

With reference now to FIG. 7, the shock unit 12 may also be interconnected between upper frame member 34 and the upper arm assembly 50 and/or the upper pivot arm assembly 142. The shock unit 112 is pivotally connected to the frame member 34 at connection points 180 and 182 at one end thereof. At the opposite end thereof, a pivotal connection 184 and 186 is made between the arms 56 of the upper arm assembly 50. Such can be made with pins and fasteners or the like. Thus, it will be appreciated by those skilled in the art, that the position of the shock unit 112 is not necessarily critical, so long as the system 10 is free to move as intended and jars and bumps are dampened due to the shock absorber 112.

With reference to FIG. 6, the motion of the rear suspension 10 from the relaxed state starts with the compression of the shock 112. The lower pivot arm 94 pivots from the frame area 40 from the ears 100 upwardly from the pivotal point 96 to the pivotal connection 172 allowing the control arm 164 to motion upwardly. The pivotable connection 168 in turn controls the pivot arm 142 to pivot upwardly and forward. The upper pivot arm 142 which is pivotally connected to the frame area 70 from the ears 74 from the pivotal connection point 140 motions upwardly and allows the pivotal connection point 158 to motion the upper arm 56 to motion upwardly also. This allows the lower arm 84 to pivot upwardly from pivot connection point 66 thus allowing the axle connection point 48 to move upwardly in addition to the lower pivot arm 94 pivotal connection point 102 to the lower arm 84 motioning the lower arm 84 to move back and upwardly thus allowing the wheel 18 to rise and provide motion in the suspension.

The opposite happens as the shock 112 decompresses. The lower pivot arm 94 moves downwardly pulling on the control arm 164 from pivotal connection 172 thus pulling on the upper pivot arm 142 to motion down and rearward from pivotal connection 168. This motion allows the upper arm 56 to motion down via pivotal connection 158 and push the lower arm 84 down which is connected to the axle connection point 48 to move downwardly allowing the wheel 18 to motion downwardly with the suspension 10.

Use of the present invention is advantageous over existing rear suspension systems in that improved rear wheeled contact with the ground is achieved. Also, rear wheel control and stability is also greatly increased, resulting in additional safety. Improved arc from the rear axle sprocket location in relation to the transmission sprocket is achieved allowing the ability to provide an exact arc that does not allow slack in the drive system (chain belt etc.), thus allowing drive systems on suspension units that otherwise would not be possible.

The placement of the upright frame rear frame rails 38 and 40 may also be placed inboard on the rear frame platform between 34 and 20 to allow drive systems to be placed on the outside of these rails. The upper and lower arms that extend out to the axle support plate then can be routed around the drive system.

Although several embodiments have been described in detail for purposes of illustration, various modifications may be made to each without departing from the scope and spirit of the invention. Accordingly, the invention is not to be limited, except as by the appended claims.

What is claimed is:

1. A rear suspension system for two-wheeled vehicles, comprising:

an upper pivot arm assembly pivotally connected to a frame of the vehicle;

a lower pivot arm assembly pivotally connected to the frame of the vehicle;

a control arm having a first end thereof connected to the upper pivot arm assembly, and a generally opposite second end thereof connected to the lower pivot arm assembly;

a rear wheel supporting unit connectable to an axle of a rear wheel of the vehicle at a first end thereof, and having an upper second end thereof connected to the upper pivot arm assembly, and having a lower second end thereof connected to the lower pivot arm assembly; and a compressible shock unit interconnected between the rear wheel support unit at one end thereof, and the vehicle frame at the opposite end thereof, wherein the rear wheel support unit is comprised of an upper arm assembly and a lower arm assembly which are interconnected and include means for connecting to the rear wheel;

wherein the lower arm assembly includes a base connected to the lower pivot arm assembly, and a first elongated arm extending from the base and including a connection point for the rear wheel, and a second elongated arm extended from the base generally parallel to the first arm and including a connection point for the rear wheel; and wherein the elongated arms of the lower arm assembly are adjustable in length.

2. The suspension system of claim 1, wherein the rear wheel connection means comprises generally parallel and spaced apart first and second axle plates having aligned apertures for accepting an axle of the rear wheel, the first and second axle plate being connected to first ends of the upper and lower arm assemblies.

3. The suspension system of claim 2, wherein the upper arm assembly is comprised of a base pivotally connected to the upper pivot arm assembly and a first elongated arm extending from the base to a connection point at the first support axle plate, and a second elongated arm extending from the base generally parallel to the first arm to a connection point at the second support axle plate.

4. The suspension system of claim 1, wherein the upper arm assembly is comprised of a base pivotally connected to the upper pivot am, assembly and a first elongated arm extending from the base to a connection point at the first elongated arm of the lower arm assembly, and a second elongated arm extending from the base generally parallel to the first arm to a pivotal connection point at the second elongated arm of the lower arm assembly.

5. The suspension system of claim 1, wherein the lower pivot arm assembly comprises a pair of angular brackets spaced apart and generally parallel to one another and having a shaft extending between first ends thereof for pivotal connection to the vehicle frame, and a shaft extending through second ends thereof for pivotal connection to the rear wheel support unit.

6. The suspension system of claim 1, wherein the control arm is adjustable in length.

7. The suspension system of claim 3, wherein the elongated arms of the upper arm assembly are adjustable in length.

8. The suspension system of claim 4, wherein the elongated arms of the upper arm assembly are adjustable in length.

9. The suspension system of claim 2, wherein the first and second elongated arms of the lower arm assembly are pivotally connected to the respective first and second axle plates.

10. The suspension system of claim 3, wherein the first and second elongated arms of the upper arm assembly are pivotally connected to the respective first and second axle plates.

11. A rear suspension system for two-wheeled vehicles, comprising:

a lower pivot arm assembly pivotally connected to the vehicle frame;

a lower arm assembly including a base connected to the lower pivot arm assembly, and a first elongated arm extending from the base and including a connection point for the rear wheel, and a second elongated arm extending from the base generally parallel to the first arm and including a connection point for the rear wheel;

an upper pivot arm assembly pivotally connected to a frame of the vehicle;

an upper arm assembly including a base pivotally connected to the upper pivot arm assembly and a first elongated arm extending from the base to a connection point at the first elongated arm of the lower arm assembly, and a second elongated arm extending from the base generally parallel to the first arm to a pivotal connection point at the second elongated arm of the lower arm assembly;

a control am, having a first end thereof connected to the upper pivot arm assembly, and a generally opposite second end thereof connected to the lower pivot arm assembly;

a compressible shock unit connected at one end thereof to the frame and extending to either the upper or lower arm assembly or upper or lower pivot arm assembly at the opposite end thereof;

wherein the elongated arms of the upper arm assembly are adjustable in. length.

12. The suspension system of claim 11, wherein the shock unit is pivotally connected to the vehicle frame.

13. The suspension system of claim 11, wherein the shock unit is pivotally connected to the upper or lower arm assembly or upper or lower pivot arm assembly.

14. The suspension system of claim 11, wherein the control arm is adjustable in length.

15. The suspension system of claim 11, wherein the elongated arms of the lower arm assembly are adjustable in length.

* * * * *